(12) United States Patent
Suzuki et al.

(10) Patent No.: US 7,670,975 B2
(45) Date of Patent: Mar. 2, 2010

(54) ALKALI FREE GLASS AND PROCESS FOR ITS PRODUCTION

(75) Inventors: Kazuhiro Suzuki, Yokohama (JP); Manabu Nishizawa, Yokohama (JP); Seiji Miyazaki, Yokohama (JP); Junichiro Kase, Yokohama (JP); Kei Maeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 121 days.

(21) Appl. No.: 11/934,138

(22) Filed: Nov. 2, 2007

(65) Prior Publication Data
US 2008/0076656 A1 Mar. 27, 2008

Related U.S. Application Data

(63) Continuation of application No. PCT/JP2006/308457, filed on Apr. 21, 2006.

(30) Foreign Application Priority Data
May 2, 2005 (JP) .............................. 2005-134579

(51) Int. Cl.
*C03C 3/091* (2006.01)
*C03C 3/085* (2006.01)
*C03C 3/087* (2006.01)

(52) U.S. Cl. .............................. 501/66; 501/69; 501/70; 501/72

(58) Field of Classification Search .................. 501/65, 501/66, 68, 69, 70, 67, 72
See application file for complete search history.

(56) References Cited

U.S. PATENT DOCUMENTS

| | | | |
|---|---|---|---|
| 5,348,916 A * | 9/1994 | Kushitani et al. ............. | 501/66 |
| 6,169,047 B1 * | 1/2001 | Nishizawa et al. ............ | 501/66 |
| 6,468,933 B1 | 10/2002 | Narita et al. | |
| 2004/0018934 A1 * | 1/2004 | Ott et al. ........................ | 501/66 |
| 2005/0026767 A1 * | 2/2005 | Takase et al. ................. | 501/56 |
| 2005/0065014 A1 * | 3/2005 | Narita et al. .................. | 501/66 |
| 2005/0096209 A1 * | 5/2005 | Kase et al. ..................... | 501/56 |
| 2007/0027019 A1 | 2/2007 | Nishizawa et al. | |

FOREIGN PATENT DOCUMENTS

| | | |
|---|---|---|
| JP | 10-25132 | 1/1998 |
| JP | 2000-159541 | 6/2000 |
| JP | 2003-137591 | 5/2003 |
| JP | 2004-299947 | 10/2004 |

OTHER PUBLICATIONS

U.S. Appl. No. 11/969,532, filed Jan. 4, 2008, Nishizawa, et al.

* cited by examiner

*Primary Examiner*—Karl E Group
*Assistant Examiner*—Noah S Wiese
(74) *Attorney, Agent, or Firm*—Oblon, Spivak, McClelland, Maier & Neustadt, L.L.P.

(57) ABSTRACT

To provide an alkali free glass which is suitable as a glass substrate for LCD and has few defects of bubbles and an undissolved starting material, and a process for producing an alkali free glass which can readily lower the defects in bubbles and an undissolved starting material.

An alkali free glass with a matrix composition comprising $SiO_2$, $Al_2O_3$, $B_2O_3$, MgO, CaO, SrO and BaO and containing substantially no alkali metal oxide, of which the temperature at which the viscosity becomes $10^2$ dPa·s, is at most 1,600° C. and which contains sulfur in an amount of from 0.001 to 0.1% as calculated as $SO_3$, as represented by the mass percentage, per 100% of the total amount of the above matrix composition, and a process for producing a glass which comprises preparing a starting material and melting it so that a sulfate be incorporated to the starting material in an amount of from 0.01 to 5% as calculated as $SO_3$, as represented by the mass percentage, per 100% of the total amount of the above matrix composition.

11 Claims, No Drawings

ALKALI FREE GLASS AND PROCESS FOR ITS PRODUCTION

TECHNICAL FIELD

The present invention relates to an alkali free glass suitable as a substrate glass for flat panel displays, which is free from defects such as bubbles and undissolved starting materials, and a process for its production.

BACKGROUND ART

Glass substrates for flat panel displays are classified roughly into an alkali glass containing an alkali metal oxide and an alkali free glass containing substantially no alkali metal oxide. An alkali glass substrate is used for e.g. plasma displays (PDP), inorganic electroluminescence displays, or field emission displays (FED), and an alkali free glass substrate is used for e.g. liquid crystal displays (LCD), or organic electroluminescence displays (OLED).

Among them, in a case of e.g. a glass substrate for LCD, e.g. a thin film of a metal or a metal oxide is formed on its surface, and therefore, the following characteristics are required.

(1) To be an alkali free glass containing substantially no alkali metal oxide (for the purpose of preventing deterioration of film properties, caused by diffusion, into a thin film, of alkali metal ions of an alkali metal oxide in a glass substrate.)

(2) To have a high strain point (for the purpose of minimizing deformation or shrinkage of a glass substrate caused by exposing the glass substrate to a high temperature during a step of forming a thin film transistor (TFT))

(3) To have an adequate chemical durability against various chemicals to be used for formation of TFT. Especially, to have a durability against buffered hydrofluoric acid (BHF: hydrofluoric acid+ammonium fluoride) to be used for etching of $SiO_x$ or $SiN_x$, chemicals containing hydrochloric acid to be used for etching of ITO (tin-doped indium oxide), various acids (e.g. nitric acid, sulfuric acid) to be used for etching of a metal electrode, or a resist-removing alkaline liquid.

(4) To have no defects (such as bubbles, stria, inclusions, undissolved materials, pits or flaws) which affect on display panels, inside or on the surface of a glass substrate.

In recent years, as an area of a glass substrate for flat panel displays becomes larger, the number of defects per glass substrate becomes large, even when such a glass substrate is one having the same defect density, whereby problems of the decrease in yield have been distinct. Especially, bubbles and undissolved starting materials are mentioned as defects.

Heretofore, a method has been employed, in which bubbles in an alkali free glass are reduced by adding e.g. $As_2O_3$ or $Sb_2O_3$ as a clarifier for reducing bubbles, to a starting material for an alkali free glass. Though $As_2O_3$ or $Sb_2O_3$, especially $As_2O_3$ is an excellent clarifier in view of releasing bubbles from a molten glass, a load on environment is immerse, and therefore, it is required to avoid its use.

On the other hand, though a sulfate as a clarifier is excellent for an alkali glass since the load on environment is remarkably low as compared with $As_2O_3$, an effect of reducing bubbles was not so high as we expected. Accordingly, a method of using a sulfate and a chloride in combination (Patent Document 1) or a method of using a sulfate and a tin oxide in combination (Patent Document 2) has been proposed. However, neither of them was sufficient in a clarification effect and still had a problem that undissolved materials remain in a glass.

Heretofore, it was difficult to lower the viscosity of an alkali free glass, secure the characteristics (strain point and acid resistance) required for e.g. a glass substrate for displays, and reduce bubbles or undissolved materials.

Patent Document 1: JP-A-10-25132
Patent Document 2: JP-A-2004-299947

DISCLOSURE OF THE INVENTION

Object to be Accomplished by the Invention

It is an object of the present invention to provide an alkali free glass which is suitable as a glass substrate for displays and has few defects such as bubbles or undissolved starting materials, and a process for its production.

Means to Accomplish the Object

In order to accomplish the above objects, the present inventors have conducted extensive studies and as a result, accomplished the present invention based on the following discoveries. They have paid attention to the changes and modifications of additives due to the temperature increase at the time of melting a glass starting material having a sulfate, or a sulfate and other components incorporated to a prescribed starting material with a matrix composition comprising $SiO_2$, $Al_2O_3$, $B_2O_3$, MgO, CaO, SrO and BaO and containing substantially no alkali metal oxide.

(1) A sulfate added to the starting material is dissolved in the glass and decomposed at a temperature of from 1200 to 1400° C., whereby clarifying gas ($SO_3$) is generated and rises together with bubbles in the glass so as to release the bubbles. Here, "rising of bubbles" means that bubbles in a molten glass move in the glass and rise to the surface of the molten glass. In a case of conventional alkali free glass, the solubility of $SO_3$ in the glass is poor and the clarification effect by $SO_3$ was poor, but in a case of the glass of the present invention, deterioration of each of the strain point and the acid resistance is suppressed, and at the same time, the temperature at which the viscosity becomes $10^2$ dPa·s, becomes at most 1,600° C., whereby it is possible to obtain a glass in which the starting material is readily soluble, the solubility of $SO_3$ in the glass is improved, and the clarification effect is improved.

(2) Further, when a chloride is incorporated in the starting material, the chloride is decomposed at a temperature of from 1,400 to 1,500° C., and clarifying gas (HCl or $Cl_2$) is generated and rises together with bubbles in the glass, whereby the clarification effect is improved.

(3) Further, when a tin compound is incorporated in the starting material, the tin compound is reduced to SnO at a temperature of from 1,450 to 1,600° C., and clarifying gas ($O_2$) is generated and rises together with bubbles in the glass, whereby the clarification effect is improved.

(4) Further, when a fluoride is incorporated in the starting material, the melting property of the starting material is further improved, whereby the clarifying effect is further improved.

(5) Further, in a case of a conventional alkali free glass, the viscosity at a temperature of from 1,200 to 1,600° C. is so high that the rising of bubbles is prevented, and the clarification effect is poor, but in a case of the glass of the present invention, the viscosity is adjusted to be suitable for the rising of bubbles, whereby the rising of bubbles is accelerated, and therefore the clarifying effect is increased.

(6) Further, in a case of the glass of the present invention, by means of the stirring effect of clarifying gas at a temperature of from 1,200 to 1,600° C., melting of the starting material is promoted, bubbles to be generated from undissolved starting materials as nuclei are also suppressed, and further the defect remaining as undissolved materials is also suppressed.

Accordingly, the present invention provides an is alkali free glass with a matrix composition comprising $SiO_2$, $Al_2O_3$, $B_2O_3$, MgO, CaO, SrO and BaO and containing substantially no alkali metal oxide, of which the temperature at which the viscosity becomes $10^2$ dPa·s, is at most 1,600° C. and which contains sulfur in an amount of from 0.001 to 0.1% as calculated as $SO_3$, as represented by the mass percentage, per 100% of the total amount of the above matrix composition.

It is preferred that the above matrix composition of the alkali free glass of the present invention comprises, as represented by the mass percentage, 49 to 69.5% of $SiO_2$, 1.5 to 19.5% of $Al_2O_3$, 5 to 10.5% of $B_2O_3$, 0 to 12.5% of MgO, 0 to 16.5% of CaO, 0 to 24% of SrO, 0 to 13.5% of BaO, 8 to 24% of CaO+SrO and 16 to 28.5% of MgO+CaO+SrO+BaO.

Further, it is preferred that the alkali free glass of the present invention further contains from 0.001 to 1% of Cl, as represented by the mass percentage, per 100% of the total amount of the above matrix composition.

Further, it is preferred that the alkali free glass of the present invention further contains from 0.01 to 1% of $SnO_2$, as represented by the mass percentage, per 100% of the total amount of the above matrix composition.

Further, it is preferred that the alkali free glass of the present invention further contains from 0.001 to 1% of F, as represented by the mass percentage, per 100% of the total amount of the above matrix composition.

Further, it is preferred that the above matrix composition of the alkali free glass of the present invention comprises, as represented by the mass percentage, 49.5 to 63.5% of $SiO_2$, 5 to 18.5% of $Al_2O_3$, 7 to 9.5% of $B_2O_3$, 0.5 to 10% of MgO, 0 to 15.5% of CaO, 0.1 to 23.5% of SrO, 0 to 12% of BaO, 9.5 to 23.5% of CaO+SrO and 16.5 to 28% of MgO+CaO+SrO+BaO.

Further, the present invention provides a process for producing an alkali free glass which comprises preparing a starting material and melting it, wherein the starting material with a matrix composition comprising $SiO_2$, $Al_2O_3$, $B_2O_3$, MgO, CaO, SrO and BaO and containing substantially no alkali metal oxide is prepared so that the temperature at which the viscosity becomes $10^2$ dPa·s, be at most 1,600° C. and a sulfate be incorporated to the starting material in an amount of from 0.01 to 5% as calculated as $SO_3$, as represented by the mass percentage, per 100% of the total amount of the above matrix composition.

It is preferred that, in the process for producing an alkali free glass of the present invention, the above matrix composition comprises, as represented by the mass percentage, 49 to 69.5% of $SiO_2$, 1.5 to 19.5% of $Al_2O_3$, 5 to 10.5% of $B_2O_3$, 0 to 12.5% of MgO, 0 to 16.5% of CaO, 0 to 24% of SrO, 0 to 13.5% of BaO, 8 to 24% of CaO+SrO and 16 to 28.5% of MgO+CaO+SrO+BaO.

Further, it is preferred that, in the process for producing an alkali free glass of the present invention, a chloride is further incorporated to the starting material in an amount of from 0.01 to 5% as calculated as Cl, as represented by the mass percentage, per 100% of the total amount of the above matrix composition.

Further, it is preferred that, in the process for producing an alkali free glass of the present invention, a tin compound is further incorporated to the starting material in an amount of from 0.01 to 1% as calculated as $SnO_2$, as represented by the mass percentage, per 100% of the total amount of the above matrix composition.

Further, it is preferred that, in the process for producing an alkali free glass of the present invention, a fluoride is further incorporated in an amount of from 0.01 to 5% as calculated as F, as represented by the mass percentage, per 100% of the total amount of the above matrix composition.

Further, it is preferred that, in the process for producing an alkali free glass of the present invention, the above matrix composition comprises, as represented by the mass percentage, 49.5 to 63.5% of $SiO_2$, 5 to 18.5% of $Al_2O_3$, 7 to 9.5% of $B_2O_3$, 0.5 to 10% of MgO, 0 to 15.5% of CaO, 0.1 to 23.5% of SrO, 0 to 12% of BaO, 9.5 to 23.5% of CaO+SrO and 16.5 to 28% of MgO+CaO+SrO+BaO.

Further, the present invention provides a process for producing an alkali free glass containing substantially no alkali metal oxide, which comprises:

(1) a step of preparing a starting material with a matrix composition comprising $SiO_2$, $Al_2O_3$, $B_2O_3$, MgO, CaO, SrO and BaO so that the temperature at which the viscosity becomes $10^2$ dPa·s, be at most 1600° C., and to the starting material, a sulfate be incorporated in an amount of from 0.01 to 5% as calculated as $SO_3$, a chloride be incorporated in an amount of from 0.01 to 5% as calculated as Cl, and a tin compound be incorporated in an amount of from 0.01 to 1% as calculated as $SnO_2$, as represented by the mass percentage, per 100% of the total amount of the above matrix composition, (2) a step of increasing a temperature of a glass starting material prepared, and melting it so as to release $SO_2$ as bubbles at a temperature of from 1,200 to 1,400° C., (3) a step of further releasing HCl and/or $Cl_2$ as bubbles at a temperature of from 1,400 to 1,500° C., and (4) a step of further releasing $O_2$ as bubbles at a temperature of from 1,450 to 1,600° C.

EFFECT OF THE INVENTION

With the alkali free glass of the present invention, deterioration of the strain point or deterioration of the acid resistance can be substantially prevented, and yet, it has few defects such as bubbles or undissolved starting materials. Therefore, such a glass is suitable as a glass substrate for LCD.

By the process for producing an alkali free glass of the present invention, it is possible to relatively readily produce an alkali free glass with few defects such as bubbles or undissolved starting materials.

Further, since it is not required for the process for producing an alkali free glass of the present invention to increase the melting temperature at the time of glass production like in conventional processes, it is possible to save energy and prolong useful life of the glass production apparatus, such being advantageous.

BEST MODE FOR CARRYING OUT THE INVENTION

Hereinafter, the wording of "as represented by the mass percentage" may sometimes be omitted, and only a numerical quantity may simply be shown.

The alkali free glass of the present invention is an alkali free glass with a matrix composition comprising $SiO_2$, $Al_2O_3$, $B_2O_3$, MgO, CaO, SrO and BaO and containing substantially no alkali metal oxide, of which the temperature at which the viscosity becomes $10^2$ dPa·s, is at most 1,600° C. and which contains sulfur in an amount of from 0.001 to 0.1% as calculated as $SO_3$, per 100% of the total amount of the above matrix composition.

The temperature at which the viscosity becomes $10^2$ dPa·s, is preferably at most 1,580° C. If the temperature exceeds 1,600° C., it is impossible to effectively carry out the clarification, bubbles tend to hardly rise, further, it is impossible to sufficiently obtain an effect of stirring the glass starting material, and further, defects such as bubbles or undissolved starting materials are likely to remain.

Further, the alkali free glass of the present invention has a strain point of at least 600° C., preferably at least 610° C., more preferably at least 620° C., and further its heat shrinkage is small.

In addition, the alkali free glass of the present invention has high acid resistance and excellent durability against hydrochloric acid-containing chemicals to be used for etching ITO. The acid resistance is evaluated with a loss of hydrochloric acid as measured by the measurement method which will be described hereinafter, and the loss is at most 1 mg/cm$^2$, preferably at most 0.5 mg/cm$^2$, more preferably at most 0.3 mg/cm$^2$.

The matrix composition of a glass having such characteristics preferably comprises, as represented by the mass percentage as calculated as the following oxide, 49 to 69.5% of $SiO_2$, 1.5 to 19.5% of $Al_2O_3$, 5 to 10.5% of $B_2O_3$, 0 to 12.5% of MgO, 0 to 16.5% of CaO, 0 to 24% of SrO, 0 to 13.5% of BaO, 8 to 24% of CaO+SrO and 16 to 28.5% of MgO+CaO+SrO+BaO. Since substantially no $As_2O_3$ or $Sb_2O_3$ is contained, such is preferred from the viewpoint of environment and also advantageous when the glass is reuse by recycling it. The amount of $As_2O_3$ and $Sb_2O_3$ as impurities in the glass is less than 0.1% based on the total amount of the above matrix composition.

Sulfate

A sulfate dissolved in a glass is decomposed at a relatively low temperature of from 1,200 to 1,400° C., and generates a large amount of $SO_2$ gas which has an effect of letting bubbles grow.

The sulfate is preferably a sulfate of at least one cation of various oxides as components of the glass starting material of the present invention, namely, a sulfate of at least one element selected from Al, Mg, Ca, Sr and Ba, more preferably a sulfate of an alkaline earth metal, particularly preferably $CaSO_4.2H_2O$, $SrSO_4$ or $BaSO_4$ since it has an remarkable effect of letting the bubbles grow.

The starting material is prepared so that the sulfate be incorporated in an amount of at least 0.01%, preferably at least 0.1%, more preferably at least 0.2%, furthermore preferably at least 0.3%, as calculated as $SO_3$, per 100% of the total amount of the above matrix composition. In order to avoid saturation of such an effect or reboiling bubbles produced at the time of finishing such as stirring, the content may be at most 5%, preferably at most 1.0%. The amount of sulfur remaining in the alkali free glass is from 0.001 to 0.1%, preferably from 0.002 to 0.05% as calculated as $SO_3$, per 100% of the total amount of the above matrix composition.

Chloride

A chloride is decomposed at a temperature of from 1,400 to 1,500° C. in a glass melt, and generates a large amount of HCl and/or $Cl_2$ gas which has an effect of letting the bubbles grow. The starting material is prepared so that the chloride be incorporated in an amount of at least 0.01%, preferably at least 0.1%, more preferably at least 0.5%, furthermore preferably at least 0.8%, as calculated as Cl, per 100% of the total amount of the above matrix composition. Since such an effect tends to be saturated or $Cl_2$ remained in the glass tends to be released in a production process of flat panel displays, its content may be at most 5%, preferably at most 2%. The amount of the chloride remaining in the alkali free glass is from 0.001 to 1%, preferably from 0.1 to 1%, more preferably from 0.2 to 0.5%, as calculated as Cl, per 100% of the total amount of the above matrix composition.

The chloride is preferably a chloride of at least one cation of various oxides as components of the glass starting material of the present invention, namely, a chloride of at least one element selected from Al, Mg, Ca, Sr and Ba, more preferably a chloride of an alkaline earth metal, particularly preferably $SrCl_2.6H_2O$ or $BaCl_2.2H_2O$, since it has a remarkable effect of letting the bubbles grow and the deliquescence property is small.

When the chloride coexists with a sulfate or water, the clarification effect is remarkably increased. Accordingly, it is preferred that the chloride is contained together with the sulfate and water in a glass starting material. Water may be directly incorporated in a glass starting material, or water may be incorporated in the form of a sulfate or a chloride containing water of crystallization, or may be incorporated in the form of a hydroxide containing at least one cation of oxides for the glass starting material. Further, it may be incorporated in the form of steam from the atmosphere at the time of melting of a glass starting material. Further, when fuels such as town gas and heavy oil are subjected to combustion by an oxygen combustion system, the steam concentration in the burning atmosphere becomes high, such being more preferred.

Tin Compound

A tin compound generates $O_2$ gas in a glass melt. In a glass melt, the tin compound is reduced from $SnO_2$ to SnO at a temperature of at least 1,450° C. and generates $O_2$ gas which has an effect of letting bubbles grow, but in order to let the bubbles grow more effectively, melting is preferably carried out at a temperature of at least 1,500° C.

The starting material is prepared so that the tin compound be incorporated in an amount of at least 0.01% as calculated as $SnO_2$, per 100% of the total amount of the above matrix composition. Since the glass coloration or devitrification tends to occur, its content may be at most 1%, preferably at most 0.5%. The amount of the tin compound remaining in the alkali free glass is from 0.01 to 1%, preferably from 0.01 to 0.5% as calculated as $SnO_2$, per 100% of the total amount of the above matrix composition.

In a case where the ratio (Sn-redox) of Sn valences is obtained by means of e.g. wet analysis by redox titration, when the ratio represented by $Sn^{2+}/(Sn^{4+}+Sn^{2+})$ in the alkali free glass is at least 0.1, $SnO_2$ generates $O_2$, and therefore, the ratio is preferably adjusted to have such a value. The ratio is more preferably at least 0.2, particularly preferably at least 0.25. If the ratio is less than 0.1, generation of bubbles by the tin compound tends to be insufficient. In order to bring the ratio to at least 0.1, the molten glass is adjusted to have a temperature of from 1,450 to 1,600° C., preferably from 1,500 to 1,600° C.

The tin compound may, for example, be an oxide, a sulfate, a chloride or a fluoride of Sn, but $SnO_2$ is particularly preferred since it has a remarkable effect of letting bubbles grow. If the particle diameter of $SnO_2$ is too large, $SnO_2$ particles may not sufficiently be melted and are likely to remain in the glass starting material. Therefore, the average particle diameter (D50) of $SnO_2$ is at most 200 μm, preferably at most 150 μm, more preferably at most 100 μm.

Further, if the particle diameter of $SnO_2$ is too is small, such particles rather tend to be agglomerated and remain undissolved in the glass melt. Therefore, the particle diameter is preferably at least 5 μm, more preferably at least 10 μm.

Like $SnO_2$, a metal oxide such as $Fe_2O_3$, $TiO_2$, $CeO_2$, $MnO_2$ or $Nb_2O_5$ or a metal salt thereof, preferably a nitrate (preferably a nitrate of an alkaline earth metal such as Mg, Ca, Sr or Ba), has an effect of generating $O_2$ along with the temperature increase of the glass melt.

Therefore, at least one of such a metal oxide or a metal salt may be incorporated as a starting material, like $SnO_2$. Its content is at least 0.01% as the total amount, as calculated as the above oxide, per 100% of the glass starting material. However, if it exceeds 1%, glass tends to be strongly colored, such being undesirable in a case where the alkali free glass is to be used as a glass substrate for flat panel displays. Its content is preferably at most 0.5%. In a case where the metal oxides are incorporated therein, the total amount of the metal oxides remaining in the glass is from 0.01 to 1%, as calculated as metal oxides, per 100% of the total amount of the above matrix composition.

Fluoride

A fluoride has an effect of reducing the viscosity and the surface tension of a glass melt, and an effect of improving the melting property of a glass starting material. The fluoride is preferably a fluoride of at least one cation of various oxides as components of the glass starting material of the present invention, namely, a fluoride of at least one element selected from Al, Mg, Ca, Sr and Ba, more preferably a fluoride of an alkaline earth metal, particularly preferably $CaF_2$, since it has an remarkable effect of increasing the solubility of the glass starting material.

The starting material is prepared so that the fluoride be incorporated in an amount of at least 0.01%, preferably at least 0.05%, as calculated as F, per 100% of the total amount of the above matrix composition. Since the strain point of an alkali free glass tends to deteriorate or $F_2$ remaining in the glass tends to be released in a production process of TFT, its content may be at most 5%, preferably at most 2%, as calculated as F. The amount of the fluoride remaining in the alkali free glass is from 0.001 to 1%, preferably from 0.01 to 1%, more preferably from 0.01 to 0.5%, furthermore preferably from 0.01 to 0.2% as calculated as F, per 100% of the total amount of the above matrix composition.

When a sulfate, a chloride and a tin compound coexist in a starting material with the matrix composition of the glass of the present invention, it is possible to carry out high clarification in a wide temperature region of from an initial stage of a melting step of the starting material to a clarification step at a higher temperature, and it is possible to produce an alkali free glass with few bubbles or undissolved starting materials. Therefore, it is particularly preferred that the above three compounds coexist therein. Further, when a fluoride is to be further incorporated therein, it is possible to produce a glass with fewer bubbles or undissolved starting materials, such being more preferred.

$SiO_2$ $SiO_2$ is a network former for a starting material of the alkali free glass of the present invention, and is an essential component. $SiO_2$ has remarkable effects of increasing the strain point, increasing the acid resistance and lowering the density of a glass. Its content is at most 69.5%, preferably at most 63.5%, more preferably at most 60%, furthermore preferably at most 58%, considering that otherwise the viscosity of the glass is likely to be too high. Further, on the other hand, in order to avoid deterioration of the acid resistance, increase of the density, lowering of the strain point, increase of the linear expansion coefficient or lowering of Young's modulus, its content is at least 49%, preferably at least 49.5%.

$Al_2O_3$

In the alkali free glass of the present invention, $Al_2O_3$ is a component for increasing the strain point, suppressing the phase separation of the glass, and increasing Young's modulus. Its content is at least 1.5%, preferably at least 5%, more preferably at least 7%, furthermore preferably at least 11%. However, in order to avoid the increase of the viscosity or the deterioration of the devitrification property, the acid resistance and the BHF resistance, its content is at most 19.5%, preferably at most 18.5%, more preferably at most 17.5%.

$B_2O_3$

In the alkali free glass of the present invention, $B_2O_3$ is an essential component for improving the melt reactivity, lowering the density, improving the BHF resistance, improving the devitrification property and lowering the linear expansion coefficient. Its content is at least 5%, preferably at least 7%, more preferably at least 7.5%, furthermore preferably at least 8%. However, in order to avoid lowering of the strain point, lowering of Young's modulus and lowering of the acid resistance, its content is at most 10.5%, preferably at most 9.5%, more preferably at most 9%.

MgO

In the alkali free glass of the present invention, MgO is a component for lowering the viscosity of the glass, and is incorporated in an amount of from 0 to 12.5%. Among the alkaline earth metal oxides, MgO is preferably incorporated since it will lower the density, will not increase the linear expansion coefficient, will not excessively lower the strain point and will improve the melting property. Its content is at least 0.5%, preferably at least 1%, more preferably at least 2%, furthermore preferably at least 3%. However, in order to avoid phase separation of the glass or deterioration of the devitrification property, the acid resistance and the BHF resistance, its content is at most 12.5%, preferably at most 10%, more preferably at most 7.5%, furthermore preferably at most 5%.

CaO

In the alkali free glass of the present invention, CaO is a component for lowering the viscosity of the glass, and is incorporated in an amount of from 0 to 16.5%. Among the alkaline earth metal oxides, CaO is a component which may be incorporated next to MgO, since it will not increase the density, will not increase the linear expansion coefficient, will not excessively lower the strain point, will improve the melting property, and will not necessarily present adverse effects to the acid resistance and the durability against a basic resist-removing liquid. In order to avoid deterioration of the devitrification property, the increase of the linear expansion coefficient, the increase of the durability, and the lowering of the acid resistance and the durability against a basic resist-removing liquid, its content is at most 16.5%, preferably at most 15.5%, more preferably at most 14.5%.

SrO

In the alkali free glass of the present invention, SrO is a component for lowering the viscosity of the glass, and is incorporated in an amount of from 0 to 24%. SrO is a component which is preferably incorporated therein so as to improve the devitrification property and the acid resistance. Further, SrO like CaO, will not increase the density, will not increase the linear expansion coefficient, will not excessively lower the strain point, will improve the melting property, will not necessarily present the adverse effects to the acid resistance and the durability against a basic resist-removing liquid. Its content is at least 0.1%, preferably at least 1%, more preferably at least 2%, furthermore preferably at least 4%.

Particularly, in a case where the alkali free glass contains BaO, in order to overcome the after-mentioned problem derived from BaO, SrO is preferably incorporated in an amount of at least 2%. However, in order to avoid the deterioration of the devitrification property, the increase of the linear expansion coefficient, the increase of the density, and the deterioration of the acid resistance and the durability against a basic resist-removing liquid, its content is at most 24%, preferably at most 23.5%, more preferably at most 22%, furthermore preferably at most 21%.

In the alkali free glass of the present invention, the content of $SiO_2$ is at most 69.5%. Therefore, the sum (CaO+SrO) of the contents of CaO and SrO is at least 8%, preferably at least 9.5%, more preferably at least 11%, furthermore preferably at least 12.5% in order to improve the devitrification property, the acid resistance and the durability against a basic resist-removing liquid. For the same reason, (CaO+SrO) is at most 24%, preferably at most 23.5%, particularly preferably at most 22%, more preferably at most 21%, furthermore preferably at most 20%.

Further, when (CaO+SrO) is within the above range, Young's modulus and the electric resistance of the glass will also be improved.

BaO

In the alkali free glass of the present invention, BaO is a component for lowering the viscosity of the glass, and is incorporated in an amount of from 0 to 13.5%. BaO is an effective component to prevent the phase separation and the devitrification of the glass and improve the acid resistance. However, in order to lower the strain point, to increase the density of the glass, to lower the Young's modulus and the melting property, to deteriorate the BHF resistance, the presence or absence of BaO and the content thereof may be determined depending upon the purpose or the application. Usually, in a case of producing a glass substrate for liquid crystal, it is preferred that its content is controlled to be at most an inevitable level. Further, in a case where BaO is to be incorporated positively, its content is at most 13.5%, and in order to lower the density or the linear expansion coefficient, the content is preferably at most 12%, more preferably at most 10%, furthermore preferably at most 8%.

As mentioned above, in the preferred composition of the alkali free glass of the present invention, (CaO+SrO) is from 8 to 24%, whereby (MgO+CaO+SrO+BaO) will inevitably increases. Further, if (MgO+CaO+SrO+BaO) is small, the viscosity of the glass becomes high, whereby the melting property will be deteriorated. Accordingly, in the alkali free glass of the present invention, (MgO+CaO+SrO+BaO) is at least 16%, preferably at least 16.5%, more preferably at least 17%, furthermore preferably at least 17.5%. On the other hand, in order to avoid the increase of the density and the increase of the linear expansion coefficient, (MgO+CaO+SrO+BaO) is at most 28.5%, preferably at most 28%, more preferably at most 27%, furthermore preferably at most 26%.

Further, in a case where the glass has a specific composition, particularly a composition satisfying at least one of the following (1) to (3), the devitrification property will deteriorate, such being undesirable.

(1) A case where the sum (MgO+CaO+SrO+BaO) of the contents of alkaline earth metal oxides (RO) exceeds 28.5% and thus is high, (2) a case where the sum (CaO+SrO) of the contents of CaO and SrO exceeds 24%, and thus is high, and (3) a case where the composition is such that the temperature at which the viscosity of the melt becomes $10^2$ dPa·s, is lower than 1,500° C.

Production of Alkali Free Glass

The process for producing an alkali free glass of the present invention is a process for producing a glass which comprises preparing a starting material and melting it, wherein the starting material is prepared to have a prescribed glass matrix composition comprising $SiO_2$, $Al_2O_3$, $B_2O_3$, MgO, CaO, SrO and BaO and containing substantially no alkali metal oxide, so that the temperature at which the viscosity becomes $10^2$ dPa·s is at most 1,600° C. Further, the starting material is prepared so that a sulfate be incorporated in the starting material in an amount of from 0.01 to 5% as calculated as $SO_3$, per 100% of the total amount of the above matrix composition.

A melt obtained by melting the prepared starting material at a temperature of from 1,450 to 1,600° C., preferably from 1,500 to 1,600° C., is formed into a glass sheet having a predetermined thickness by e.g. a float process. Then, such a glass sheet is cooled and cut into a glass sheet for substrates. Here, the float process is a process for forming a glass on a molten tin, and is a forming method being widely used. The alkali free glass of the present invention may be formed by using another conventional method. Such another method may, for example, be a well known method such as a press method, a down draw method or a fusion method. However, in order to constantly produce a thin sheet or a large size glass sheet for substrates (e.g. thickness: 0.5 to 1.5 mm, dimension: at least 1,700×1,400 mm), the float process is suitable.

Particularly, the alkali-free glass is preferably produced via (1) a step of preparing a starting material so as to have a prescribed matrix composition comprising $SiO_2$, $Al_2O_3$, $B_2O_3$, MgO, CaO, SrO and BaO so that the temperature at which the viscosity becomes $10^2$ dPa·s, is at most 1600° C. and so that the starting material contains a sulfate in an amount of from 0.01 to 5% as calculated as $SO_3$, a chloride in an amount of from 0.01 to 5% as calculated as Cl, and a tin compound in an amount of from 0.01 to 1% as calculated as $SO_3$, per 100% of the total amount of the above matrix composition, (2) a step of increasing a temperature of a glass starting material prepared, and melting it so as to release $SO_2$ as bubbles at a temperature of from 1,200 to 1,400° C., (3) a step of further releasing HCl and/or $Cl_2$ as bubbles at a temperature of from 1,400 to 1,500° C., and (4) a step of further releasing $O_2$ as bubbles at a temperature of from 1,450 to 1,600° C.

EXAMPLES

In Table 1, with regard to components prepared as an industrial glass starting material and in Table 2, with regard to a glass obtained, the contents of respective components per 100% of the total amount of the matrix composition comprising $SiO_2$, $Al_2O_3$, $B_2O_3$, MgO, CaO, SrO and BaO are represented by the mass percentage.

Examples 1 to 5 show Examples of the present invention, and Examples 6 to 8 show Comparative Examples.

When a prescribed amount of a starting material in Table 1 was put into an electric furnace and melted at 1,600° C. for 1 hour, bubbles were released by $SO_3$ at a temperature of from 1,200 to 1,400° C., by Cl at a temperature of from 1,400 to 1,500° C., and by $SnO_2$ at a temperature of from 1,450 to 1,600° C., for clarification. The glass melt was cast on a carbon plate and annealed to obtain a glass shown in Table 2. As the remaining amounts in the glass of the sulfate, the chloride, the tin compound and the fluoride, added to the starting material, $SO_3$ was 0.01%, Cl was 0.3%, $SnO_2$ was 0.2% and F was 0.01%.

The characteristics of the glass obtained was measured by the following method, and the results are shown in Table 2.

The number of bubbles in the glass was visually observed by using a microscope. "A" indicates a case where the number of bubbles in 1 cm$^3$ of the glass was at most 10, "B" indicates a case where it was more than 10 and at most 30, and "C" indicates a case where it was more than 30.

The temperature at which the viscosity becomes 10$^2$ dPa·s, was calculated from a high-temperature viscosity measured by a cylinder rotation method, by using the following formula of Fulcher:

$$\log \eta = A/(T-T_0) - B$$

(wherein, η: Viscosity of glass (dPa·s), T: temperature of glass (° C.), A, T$_0$, B: Constants)

The strain point (observed value) of the glass was measured in accordance with a fiber elongation method stipulated in JIS R3103. The strain point (calculated value) was obtained in such a manner that the contribution degree $a_i$ to the strain point (i=1 to 7, the respective seven glass components), was obtained by a regression calculation, and the strain point (calculated value) was obtained by calculation from $\Sigma a_i X_i + b$ ($X_i$ is the mol fraction of each glass component, and b is a constant). The weight loss of hydrochloric acid in the glass was obtained in such a manner that the sample glass was immersed in a 1/10 N aqueous hydrochloric acid solution for 20 hours at 90° C., and then such a weight loss was obtained from a weight loss per unit surface area of the glass.

In Table 1, "a" indicates a case where the weight loss of hydrochloric acid was at most 0.3 mg/cm$^2$, "b" indicates a case where it was more than 0.3 mg/cm$^2$ and at most 0.6 mg/cm$^2$, and "c" indicates a case where it was more than 0.6 mg/cm$^2$.

In Examples 1 to 5, the temperature at which the viscosity becomes 10$^2$ dPa·s, is at most 1,600° C., and further, SO$_3$ and other additives are contained therein, whereby the number of bubbles is small ("A"). Further, even when the temperature at which the viscosity becomes 10$^2$ dPa·s, is at most 1,600° C., the strain point is at least 600° C., and no weight loss of hydrochloric acid occurs ("a" or "b").

On the other hand, in the case of the glass in Example 6, the temperature at which the viscosity becomes 10$^2$ dPa·s, is at most 1,600° C., but the glass contains no SO$_3$, whereby the number of bubbles is higher than in Examples of the present invention.

Further, in Examples 7 to 8, the temperature at which the viscosity becomes 10$^2$ dPa·s, is higher than 1,600° C., and the clarification effect is poor, and the number of bubbles is large ("C") though the glass contains SO$_3$ and other additives.

TABLE 1

| | (Mass %) | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| SiO$_2$ | 56.6 | 56.6 | 56.6 | 56.7 | 58.0 | 56.6 | 59.8 | 56.6 |
| Al$_2$O$_3$ | 12.4 | 12.4 | 12.4 | 12.4 | 12.7 | 12.4 | 17.0 | 11.0 |
| B$_2$O$_3$ | 8.5 | 8.5 | 8.5 | 8.5 | 8.7 | 8.5 | 7.8 | 5.8 |
| MgO | 4.3 | 4.3 | 4.3 | 5.5 | 5.6 | 4.3 | 3.3 | 1.9 |
| CaO | 6.4 | 6.4 | 6.4 | 4.3 | 7.0 | 6.4 | 4.2 | 3.0 |
| SrO | 11.8 | 11.8 | 11.8 | 12.6 | 8.1 | 11.8 | 7.7 | 6.5 |
| BaO | 0 | 0 | 0 | 0 | 0 | 0 | 0.1 | 15.2 |
| CaO + SrO | 18.2 | 18.2 | 18.2 | 16.9 | 15.0 | 18.2 | 11.9 | 9.5 |
| MgO + CaO + SrO + BaO | 22.5 | 22.5 | 22.5 | 22.4 | 20.7 | 22.5 | 15.4 | 26.6 |
| SO$_3$ | 0.36 | 0.36 | 0.36 | 0.36 | 0.36 | 0 | 0.36 | 0.1 |
| Cl | 1 | 1 | 0 | 1 | 1 | 0 | 0.5 | 0.6 |
| SnO$_2$ | 0.2 | 0 | 0 | 0 | 0 | 0 | 0 | 0 |
| F | 0.14 | 0.14 | 0.14 | 0.14 | 0.14 | 0.14 | 0.14 | 0.2 |
| Fe$_2$O$_3$ | 0.07 | 0.07 | 0.07 | 0.07 | 0.07 | 0.07 | 0.55 | 0.08 |

TABLE 2

| | (Mass %) | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| SiO$_2$ | 56.6 | 56.6 | 56.6 | 56.7 | 58.0 | 56.6 | 59.8 | 56.6 |
| Al$_2$O$_3$ | 12.4 | 12.4 | 12.4 | 12.4 | 12.7 | 12.4 | 17.0 | 11.0 |
| B$_2$O$_3$ | 8.5 | 8.5 | 8.5 | 8.5 | 8.7 | 8.5 | 7.8 | 5.8 |
| MgO | 4.3 | 4.3 | 4.3 | 5.5 | 5.6 | 4.3 | 3.3 | 1.9 |
| CaO | 6.4 | 6.4 | 6.4 | 4.3 | 7.0 | 6.4 | 4.2 | 3.0 |
| SrO | 11.8 | 11.8 | 11.8 | 12.6 | 8.1 | 11.8 | 7.7 | 6.5 |
| BaO | 0 | 0 | 0 | 0 | 0 | 0 | 0.1 | 15.2 |
| CaO + SrO | 18.2 | 18.2 | 18.2 | 16.9 | 15.0 | 18.2 | 11.9 | 9.5 |
| MgO + CaO + SrO + BaO | 22.5 | 22.5 | 22.5 | 22.4 | 20.7 | 22.5 | 15.4 | 26.6 |
| SO$_3$ | 0.01 | 0.01 | 0.01 | 0.01 | 0.01 | 0 | 0.01 | 0.01 |
| Cl | 0.3 | 0.3 | 0 | 0.3 | 0.3 | 0 | 0.3 | 0.3 |
| SnO$_2$ | 0.2 | 0 | 0 | 0 | 0 | 0 | 0 | 0 |
| F | 0.01 | 0.01 | 0.01 | 0.01 | 0.01 | 0.01 | 0.01 | 0.01 |
| Fe$_2$O$_3$ | 0.07 | 0.07 | 0.07 | 0.07 | 0.07 | 0.07 | 0.55 | 0.08 |
| Temperature at which the viscosity becomes 10$^2$ dPa·s (° C.) | 1523 | 1523 | 1523 | 1527 | 1521 | 1523 | 1657 | 1627 |
| Numbers of bubbles (number/cm$^3$) | A | B | A | A | A | B | C | C |

TABLE 2-continued

| | (Mass %) | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Strain point (observed value) (° C.) | 632 | 632 | 632 | | | 632 | 668 | 635 |
| Strain point (calculated value) (° C.) | | | | 633 | 637 | | | |
| Weight loss of hydrochloric acid (mg/cm$^2$) | a | a | a | b | b | a | a | a |

INDUSTRIAL APPLICABILITY

The alkali free glass of the present invention is suitable as a glass substrate for flat panel displays, which has few defects such as bubbles or undissolved starting materials.

The entire disclosure of Japanese Patent Application No. 2005-134579 filed on May 2, 2005 including specification, claims and summary is incorporated herein by reference in its entirety.

What is claimed is:

1. An alkali free glass with a matrix composition comprising, as represented by the mass percentage:

| | |
|---|---|
| SiO$_2$ | 49 to 69.5%, |
| Al$_2$O$_3$ | 1.5 to 19.5%, |
| B$_2$O$_3$ | 5 to 10.5%, |
| MgO | 0 to 12.5%, |
| CaO | 0 to 16.5%, |
| SrO | 0 to 24%, |
| CaO + SrO | 8 to 24%, and |
| MgO + CaO + SrO | 16 to 28.5%; | wherein
glass comprises substantially no alkali metal oxide, As$_2$O$_3$, Sb$_2$O$_3$ and BaO;
temperature of the glass at which the viscosity becomes 10$^2$ dPa·s, is at most 1,600° C.;
the glass comprises sulfur in an amount of from 0.001 to 0.1% as calculated as SO$_3$, as represented by the mass percentage, per 100% of the total amount of the matrix composition; and
the weight loss of hydrochloric acid in the glass is at most 0.6 mg/cm$^2$.

2. The alkali free glass according to claim 1, further comprising from 0.001 to 1% of Cl, as represented by the mass percentage, per 100% of the total amount of the matrix composition.

3. The alkali free glass according to claim 2, further comprising from 0.01 to 1% of SnO$_2$, as represented by the mass percentage, per 100% of the total amount of the matrix composition.

4. The alkali free glass according to claim 3, further comprising from 0.001 to 1% of F, as represented by the mass percentage, per 100% of the total amount of the matrix composition.

5. The alkali free glass according to claim 1, wherein the matrix composition comprises, as represented by the mass percentage:

| | |
|---|---|
| SiO$_2$ | 49.5 to 63.5%, |
| Al$_2$O$_3$ | 5 to 18.5%, |
| B$_2$O$_3$ | 7 to 9.5%, |
| MgO | 0.5 to 10%, |
| CaO | 0 to 15.5%, |
| SrO | 0.1 to 23.5%, |
| CaO + SrO | 9.5 to 23.5%, |
| MgO + CaO + SrO | 16.5 to 28%. |

6. A process for producing an alkali free glass comprising: preparing a starting material with a matrix composition comprising as represented by the mass percentage:

| | |
|---|---|
| SiO$_2$ | 49 to 69.5%, |
| Al$_2$O$_3$ | 1.5 to 19.5%, |
| B$_2$O$_3$ | 5 to 10.5%, |
| MgO | 0 to 12.5%, |
| CaO | 0 to 16.5%, |
| SrO | 0 to 24%, |
| CaO + SrO | 8 to 24%, and |
| MgO + CaO + SrO | 16 to 28.5%; | wherein the matrix composition comprises substantially no alkali metal oxide, As$_2$O$_3$, Sb$_2$O$_3$ and BaO;
adding sulfate to the starting material in an amount of from 0.01 to 5% as calculated as SO$_3$, as represented by the mass percentage, per 100% of the total amount of the matrix composition; and
melting the prepared sulfate containing starting material; wherein the temperature of the glass at which the viscosity becomes 10$^2$ dPa·s, is at most 1,600° C., and the weight loss of hydrochloric acid in the glass is at most 0.6 mg/cm$^2$.

7. The process for producing an alkali free glass according to claim 6, wherein a chloride is further added to the starting material in an amount of from 0.01 to 5% as calculated as Cl, as represented by the mass percentage, per 100% of the total amount of the matrix composition.

8. The process for producing an alkali free glass according to claim 7, wherein a tin compound is further added to the starting material in an amount of from 0.01 to 1% as calculated as SnO$_2$, as represented by the mass percentage, per 100% of the total amount of the matrix composition.

9. The process for producing an alkali free glass according to claim 8, wherein a fluoride is further added in an amount of from 0.01 to 5% as calculated as F, as represented by the mass percentage, per 100% of the total amount of the matrix composition.

10. The process for producing an alkali free glass according to claim 6, wherein the matrix composition comprises, as represented by the mass percentage:

| | |
|---|---|
| SiO$_2$ | 49.5 to 63.5%, |
| Al$_2$O$_3$ | 5 to 18.5%, |

-continued

| | |
|---|---|
| B$_2$O$_3$ | 7 to 9.5%, |
| MgO | 0.5 to 10%, |
| CaO | 0 to 15.5%, |
| SrO | 0.1 to 23.5%, |
| CaO + SrO | 9.5 to 23.5% and |
| MgO + CaO + SrO | 16.5 to 28%. |

11. A process for producing an alkali free glass comprising substantially no alkali metal oxide, As$_2$O$_3$, Sb$_2$O$_3$ and Bao, the process comprising:

(1) preparing a starting material with a matrix composition comprising as represented by the mass percentage:

| | |
|---|---|
| SiO$_2$ | 49 to 69.5%, |
| Al$_2$O$_3$ | 1.5 to 19.5%, |
| B$_2$O$_3$ | 5 to 10.5%, |
| MgO | 0 to 12.5%, |
| CaO | 0 to 16.5%, |
| SrO | 0 to 24%, |
| CaO + SrO | 8 to 24%, |
| MgO + CaO + SrO | 16 to 28.5%, | a sulfate in an amount of from 0.01 to 5% as calculated as SO$_3$, a chloride in an amount of from 0.01 to 5% as calculated as Cl, and a tin compound in an amount of from 0.01 to 1% as calculated as SnO$_2$, as represented by the mass percentage, per 100% of the total amount of the matrix composition, (2) increasing a temperature of the prepared glass starting material, and melting the prepared glass starting material so as to release SO$_2$ as bubbles at a temperature of from 1,200 to 1,400° C., (3) releasing HCl and/or Cl$_2$ as bubbles at a temperature of from 1,400 to 1,500° C., and (4) releasing O$_2$ as bubbles at a temperature of from 1,450 to 1,600° C.;

wherein the temperature of the glass obtained at which the viscosity becomes $10^2$ dPa·s, is at most 1,600° C., and the weight loss of hydrochloric acid in the glass obtained is at most 0.6 mg/cm$^2$.

* * * * *